(12) United States Patent
Turpin, Jr.

(10) Patent No.: US 6,451,105 B1
(45) Date of Patent: Sep. 17, 2002

(54) CEMENTITIOUS COMPOSITION WITH LIMESTONE ACCELERATOR

(76) Inventor: Raymond C. Turpin, Jr., 3825 Wieuca Ter., NE., Atlanta, GA (US) 30342

( * ) Notice: Subject to any disclaimer, the term of this patent is extended or adjusted under 35 U.S.C. 154(b) by 0 days.

(21) Appl. No.: 09/715,388

(22) Filed: Nov. 17, 2000

(51) Int. Cl.$^7$ ................................................ C04B 7/06
(52) U.S. Cl. ...................................... 106/738; 106/817
(58) Field of Search ................................. 106/738, 817

(56) References Cited

U.S. PATENT DOCUMENTS

| | | |
|---|---|---|
| 318,043 A | 5/1885 | Scott |
| 2,164,871 A | 7/1939 | Eichenlaub |
| 3,558,526 A | 1/1971 | Hall |
| 4,773,934 A | 9/1988 | Colin |
| 5,478,390 A | 12/1995 | Cruaud et al. |
| 5,584,926 A * | 12/1996 | Borgholm et al. .......... 106/713 |
| 5,603,758 A | 2/1997 | Schreifels, Jr. et al. |
| 5,624,493 A | 4/1997 | Wagh et al. |
| 5,908,502 A | 6/1999 | Cangiano et al. |

FOREIGN PATENT DOCUMENTS

| | | | |
|---|---|---|---|
| JP | 52000819 A2 | * | 1/1977 |

* cited by examiner

*Primary Examiner*—Paul Marcantoni
(74) *Attorney, Agent, or Firm*—Akin, Gump, Strauss, Hauer & Feld, LLP

(57) ABSTRACT

A cementitious composition comprising Portland cement and a finely divided limestone accelerator. The Portland cement has a fineness of at least about 3,200 Blaine. The composition may contain one or more blast furnace slags or pozzolans, such as fly ash or silica fume. When pozzolans or slags are present, the weight ratio of limestone to a mortar mixture of Portland cement, limestone, sand, water, and pozzolans or blast furnace slags, is in the range of about 1.4% to about 5.6%. The finely divided limestone acts as an accelerator, decreasing the initial set time of the resulting composition, and increasing the rate of strength gain.

29 Claims, No Drawings

CEMENTITIOUS COMPOSITION WITH LIMESTONE ACCELERATOR

FIELD OF THE INVENTION

The present invention relates generally to Portland cement mixtures, and more particularly to Portland cement mixtures characterized by the addition of finely divided limestone.

BACKGROUND OF THE INVENTION

Portland cement concrete has found increasing use in the construction industry since it was first introduced in the early 19th century. Since that time, there has been very little change in its composition. However, the modem economy has created new requirements for Portland cement manufacture and use, and those requirements have not been adequately met by advances in Portland cement compositions.

For example, environmental concerns have focused on the carbon dioxide emissions resulting from Portland cement manufacture. Carbon dioxide emissions are thought to contribute to the so-called "greenhouse effect," which is widely believed to have contributed to global warming. Portland cement manufacture has been a contributor to the emission of carbon dioxide into the atmosphere. One approach to this problem has been the increasing use of pozzolans and blast furnace slags as additions to Portland cement in order to decrease carbon dioxide emissions during its manufacture. Examples of such pozzolans include fly ash and silica fume. The introduction of pozzolans and slags into cementitious mixtures, including Portland cement, has become a well-accepted practice.

A disadvantage of introducing pozzolans or blast furnace slags into Portland cement mixtures is that it adversely affects two key measures of performance commonly used to assess cementitious mixtures. Specifically, pozzolans and slags are known to lengthen the initial setting time and decrease the rate of compressive strength gain of the resulting cementitious composition. This set and strength retardation caused by pozzolan and slag addition slows the rate of construction of the project for which the resulting cementitious composition is being used.

The need for both rapid hardening and early strength gain of Portland cement concrete is dictated by the cost of time in modem construction. The use of pozzolans or slags in such mixtures, although beneficial to the environment, has a direct and calculable cost due to the additional time needed to achieve initial set and to the additional measures that must be taken to ensure the requisite early strength of the construction project to which it is applied.

Certain accelerators have been developed to offset the decrease in rate of set and strength gain occasioned by the addition of pozzolans and slags. These include calcium chloride, calcium nitrite and calcium nitrate. However, calcium chloride creates the potential for corrosion of any steel reinforcement that is to be placed within the concrete, and calcium nitrite and calcium nitrate are relatively expensive and less efficient. The disadvantages associated with these known accelerators make them unsuitable for many applications.

SUMMARY OF THE INVENTION

What is needed is a Portland cement composition that includes an accelerator to increase the rate of initial set and the rate of strength gain without the disadvantages of the prior art accelerators. Such an accelerator should be particularly effective in the presence of pozzolans, blast furnace slags and the like.

Accordingly, an object of the present invention is to provide a Portland cement composition with a relatively low-cost accelerator for increasing the rate of initial set and rate of strength gain of the composition.

Another object of the invention is to provide a Portland cement composition with an accelerator that does not cause degradation of steel reinforcing placed in the composition.

Another object of the invention is to provide a Portland cement composition with an accelerator that offsets the slowing in initial set time and rate of strength gain of the composition caused by the addition of pozzolans and blast furnace slags.

In satisfaction of these and other objects, there is provided an improved cementitious composition comprising Portland cement and finely ground or divided limestone. This limestone, which is carbonate material composed chiefly of calcium carbonate, may be added to the Portland cement with or without pozzolans or blast furnace slag. In one embodiment, one or more pozzolans or slags are added to the Portland cement and limestone mixture. Whether or not pozzolans or blast furnace slag forms a part of the mixture, the finely divided limestone acts as an accelerator to increase the rate of set and the rate of strength gain of the resulting composition. In one aspect of the invention, the Portland cement is of fineness commonly associated with commercial Portland cement. Typically, these Portland cements have a Blaine fineness of at least about 3,200 sq. cm. per gram ($cm^2/g$), and more typically are in the range of Blaine fineness from about 3,500 $cm^2/g$ to about 5,500 $cm^2/g$.

In another aspect of the invention, when pozzolans or blast furnace slags are added to the composition, one or more pozzolans or slags are selected. In one embodiment, there is added class C fly ash, which is the particulate effluent from the burning of sub-bituminous coal. In another embodiment, there is added ground, granulated blast furnace slag. In yet another embodiment, pozzolans and slags are added in combination. Although other pozzolans or slags may be chosen in addition to, or as a substitute for, the foregoing, it has been discovered that the effect of the finely divided limestone on rate of set and rate of strength gain is particularly pronounced in the presence of these pozzolans or blast furnace slags. Moreover, the effect is even more pronounced as these pozzolans or blast furnace slags are added in increased amounts to dilute the Portland cement mixture.

The invention achieves the above and other objects through the use of finely divided limestone in proportions to Portland cement and pozzolans or blast furnace slags not heretofore known or appreciated. Limestone has previously been used in masonry cementing compositions and the like to increase grinding efficiency, achieve color compatible extensions in volume, lower cement strength potential, lower heat of hydration, or increase workability. However, the present invention is characterized by the use of limestone as an accelerator to increase the rate of initial set and the rate of strength gain, particularly in the presence of pozzolans or blast furnace slags.

DETAILED DESCRIPTION OF THE PREFERRED EMBODIMENTS

As previously pointed out, preferably the inventive composition comprises Portland cement having a fineness of at least about 3,200 sq. cm/gm (Blaine). In practice, Portland cements more coarse than about 3,200 Blaine are not expected to exhibit the degree of reactivity that is suitable for ordinary construction.

The invention employs finely divided limestone, which in practice may exist as part of bulk limestone with some particles lacking the requisite fineness. Those or ordinary skill in the art will recognize that both the calcium carbonate content of the limestone and the proportion of the bulk limestone having the requisite fineness can be expected to affect the gross amount of limestone necessary to be mixed for achieving the desired result. For example, a sample of graded limestone sand with 50% of its particles larger than the standard #100 U.S. sieve will require about double the amount of total limestone content in a given cementitious composition in order to achieve equal reactive presence of limestone with no particles larger than #100 sieve, where the requisite level of fineness is about #100 sieve. Similarly, a limestone with substantial alternative mineral content (e.g., magnesium) will require proportionally increased addition.

Preferably, finely divided limestone is added to mortars containing Portland cement, sand and water. Pozzolans, blast furnace slag, or both are also added. The Portland cement, pozzolans, and slags form a first cementitious mixture, wherein the weight ratio of minus #100 sieve (150 micron) limestone to the resulting mortar mixture (cement, limestone, pozzolan and/or slag, sand and water) ranges from about 30:2200 to 120:2200 or 1.4% to about 5.6%. Any of the pozzolans can be used, including class C fly ash, class F fly ash, or silica fume. These pozzolans and slags may be used individually, or added to the composition in various combinations with each other.

The limestone is preferably naturally occurring limestone, commonly about 50% to 95% calcium carbonate by weight. There are many common commercial geographical sources of limestone including those from Atlanta, Florida, Oklahoma and Detroit. The efficacy of the limestone addition increases with decreasing particle size and increasing calcium carbonate content. The limestone is finely divided, preferably having fineness at least minus # 100 U.S. standard sieve (150 micron). As shown in the examples below, the characteristics of increased rate of set and rate of strength gain are also exhibited by cementitious compositions of Portland cement with finely divided limestone even in the absence of pozzolans or blast furnace slag. Although the effect on rate of set and rate of strength gain is most pronounced in the presence of pozzolans or slags, and more particularly in dilute compositions having higher concentrations of pozzolans or slags, these effects are also exhibited in the absence of pozzolans or slags.

The preferred method for making the inventive cementitious composition includes the step of first making a mortar containing Portland cement, sand and water. Such a mortar will typically have some entrained air. To this mortar are added pozzolans and/or blast furnace slag, and finely divided limestone in amounts as noted in the examples given below. The following examples illustrating the preparation of the inventive cementitious mortar composition and the relevant physico-mechanical properties are conveyed by way of indication, not of limitation, of the present invention.

In each example, a Hobarto® mixer as described in ASTM C-109 is used for mixing. About 80% of the water is placed in the mixing bowl. The cement, pozzolans and limestone additions are then cumulatively weighed and dumped in the mixer with the water, and the mixer is started on slow speed.

Time of set is judged from the contact of water and cement, which are mixed for one minute. ASTM C-33 concrete sand is then added to the mixture. The mixture is then mixed for one more minute, with water added as necessary to gain the desired workability. Workability is evaluated using a truncated cone like the one described in ASTM C-128 for testing the moisture condition of sand. It has been empirically determined that if this cone is filled with mortar in three layers (as in the ASTM C-143 test for the slump of concrete) and a 1/8 inch bullet-nosed round rod is used for compaction, then 1/16 inch slump on this cone is equal to 1/4 inch slump on concrete containing one inch topsized stone.

In the examples, the mixer is stopped at the expiration of two minutes, the bowl is removed, and the inner sides and bottom of the bowl are scraped with the spoon to dislodge any unmixed material. The bowl is then returned to its former position and mixing is restarted after three and a half minutes from the initial contact of water and cement. After mixing for an additional minute, the mixer is stopped and the slump test run. The mixed temperature is also taken, and a unit weight test is run utilizing a 400 cc cup as described in ASTM C-185. The cup is filled in three layers and consolidated with the same 1/8-inch rod as used in the slump test. The sides of the cup are struck to eliminate any voids left by the rod.

Weight of the net contents of the 400 cc of mortar is then determined to insure proper volume for the weights used. The mortar is then returned to the bowl, remixed for 30 seconds, and cast into six two-inch cubes that are moist cured. Three of these cubes are tested for compressive strength after seven days, and the other three cubes are tested for compressive strength after 28 days. The balance of the mortar is then placed into a four-inch diameter plastic mold for initial set testing utilizing a proctor needle as described in ASTM C-403.

For each example, the weights of Portland cement, sand, water, and the selected pozzolans or blast furnace slag are given below. Workability and mortar temperature (in degrees Fahrenheit) are also given. The performance-related characteristics of initial set time (in minutes) and both seven-day strength and 28-day strength (in pounds per square inch) are also given. For each example of limestone-enhanced cementitious mortar composition, the corresponding parameters and measurements for a control composition omitting only the finely divided limestone is also given for comparison.

EXAMPLE 1

Pulverized Tulsa, Oklahoma limestone is added to a cementitious mortar of Portland cement that also includes sand and water, wherein the weight ratio of limestone to resulting mortar weight after mixing is 90:2245, or 4.0% weight ratio of limestone to resulting mortar weight. The inventive composition is described in the right-hand column of Table 1 below. A control composition having no limestone is shown in the left-hand column.

TABLE 1

|  | Control | Mix #1 |
|---|---|---|
| Portland cement | 324 | 324 |
| Tulsa Limestone | None | 90 |
| C fly ash | None | None |
| F fly ash | None | None |
| Sand | 1566 | 1476 |
| Water | 355 | 350 |

TABLE 1-continued

|  | Control | Mix #1 |
|---|---|---|
| Workability | 12 | 12 |
| Mortar temp. ° F. | 73 | 74 |
| Initial set, minutes | 279 | 205 |
| 7 day strength, p.s.i. | 1780 | 2120 |
| 28 day strength, p.s.i. | 2850 | 2960 |

The finely divided Tulsa limestone is minus #100 sieve. As can be seen from Table 1, a 4.0 % addition of limestone by weight of mortar to the control mix decreases initial set by 74 minutes, increases 7-day strength by 19.1%, and increases 28-day strength by 3.9%.

EXAMPLE 2

Florida limestone fines are added to a cementitious mortar comprising Portland cement, class C fly ash, sand and water. The weight ratio of limestone to the resulting mortar (after adding limestone) is 60:2177, or 2.8% of limestone addition to a cementitious mixture of Portland cement, limestone, fly ash, sand and water. The component weights and performance characteristics of this example are given in Table 2.

TABLE 2

|  | Control | Mix #1 |
|---|---|---|
| Portland cement | 405 | 405 |
| FL. Limestone | None | 60 |
| C fly ash | 135 | 135 |
| F fly ash | None | None |
| Sand | 1350 | 1290 |
| Water | 280 | 287 |
| Workability | 13 | 10 |
| Mortar temp., ° F. | 66 | 65 |
| Initial set, minutes | 320 | 300 |
| 7 day strength, p.s.i. | 5720 | 6710 |
| 28 day strength, p.s.i. | 7820 | 8940 |

The finely divided Florida limestone is minus #100 sieve. As can be seen from Table 2, a 2.8 % addition of limestone by weight of mortar to the control mix decreases initial set by 20 minutes, increases 7-day strength by 17%, and increases 28-day strength by 14%.

EXAMPLE 3

Florida limestone is added to a cementitious mortar comprising Portland cement, class C fly ash, class F fly ash, sand and water. The weight ratio of limestone to the resulting mortar is 60:2170, or 2.8% weight ratio of limestone to a cementitious mixture of Portland cement, limestone, fly ash, sand and water. The component weights and performance characteristics of this example are given in Table 3.

TABLE 3

|  | Control | Mix #1 |
|---|---|---|
| Portland cement | 405 | 405 |
| FL limestone | None | 60 |
| C fly ash | 135 | 135 |
| F fly ash | 100 | 100 |
| Sand | 1250 | 1190 |
| Water | 281 | 280 |
| Workability | 13 | 16 |
| Mortar temp., ° F. | 67 | 66 |
| Initial set, minutes | 310 | 285 |

TABLE 3-continued

|  | Control | Mix #1 |
|---|---|---|
| 7 day strength, p.s.i. | 5500 | 6830 |
| 28 day strength, p.s.i. | 7830 | 9290 |

The finely divided Tulsa limestone is minus #100 sieve. As can be seen from Table 3, a 2.8% addition of limestone by weight of mortar to the control mix decreases initial set by 25 minutes, increases 7-day strength by 24%, and increases 28-day strength by 18.6%.

EXAMPLE 4

Florida limestone fines or, alternatively, Atlanta limestone fines are added to a cementitious mortar comprising Portland cement, ground, granulated blast furnace slag of grade 120, sand and water. When either Florida limestone or Atlanta limestone is used, the weight ratio of limestone to the resulting mortar (after adding limestone) is 60:2179, or 2.8% weight ratio of limestone to a cementitious mixture of Portland cement, limestone, blast furnace slag, sand and water. The component weights and performance characteristics of this example using Atlanta limestone are given in the middle column of Table 4. The component weights and performance characteristics of this example using Florida limestone are given in the right-hand column of Table 4.

TABLE 4

|  | Control | Mix #1 | Mix #2 |
|---|---|---|---|
| Portland cement | 270 | 270 | 270 |
| Atlanta limestone | None | 60 | None |
| FL limestone material | None | None | 60 |
| Ground, granulated blast furnace slag (grade 120) | 270 | 270 | 270 |
| Sand | 1350 | 1290 | 1290 |
| Water | 289 | 289 | 289 |
| Workability | 14 | 15 | 14 |
| Mortar temp., ° F. | 77 | 72 | 72 |
| Inititial set., minutes | 354 | 302 | 277 |
| 7 day strength, p.s.i. | 4000 | 5625 | 5725 |
| 28 day strength, p.s.i. | 8850 | 8470 | 8350 |

The finely divided Atlanta and Florida limestones are minus #100 sieve. As can be seen from Table 4, a 2.8% addition of limestone by weight of mortar to the control mix decreased initial set by 52 and 77 minutes respectively and increased 7-day strength by 40.6% and 43.1% respectively.

EXAMPLE 5

Atlanta limestone is added to a cementitious mortar comprising Portland cement, ground, granulated blast furnace slag of grade 120, sand and water. The weight ratio of limestone to the resulting mortar is 120:2179, or 5.5% weight ratio of limestone to cementitious mixture of Portland cement, limestone, blast furnace slag, sand and water. The component weights and performance characteristics of this example are given in Table 5.

TABLE 5

|  | Control | Mix #1 |
|---|---|---|
| Portland cernent | 270 | 270 |
| Atlanta limestone | None | 120 |
| Ground granulated blast | 270 | 270 |

TABLE 5-continued

|  | Control | Mix #1 |
|---|---|---|
| furnace slag (grade 120) |  |  |
| Sand | 1350 | 1230 |
| Water | 289 | 289 |
| Workability | 14 | 11 |
| Mortar temp., ° F. | 77 | 72 |
| Initial set, minutes | 354 | 266 |
| 7 day strength, p.s.i. | 4000 | 6010 |
| 28 day strength, p.s.i. | 8850 | 8300 |

The finely divided Atlanta limestone is minus #100 sieve. As can be seen from Table 5, a 5.5 % addition of limestone by weight of mortar to the control mix decreases initial set by 88 minutes and increases 7-day strength by 50.2%. This example may be compared with Example 4 using 60 g Atlanta limestone, from which it can be seen that doubling the weight of limestone decreases initial set time by an additional 36 minutes and increases 7-day strength by an additional 9.6%.

EXAMPLE 6

Detroit limestone fines are added to a cementitious mortar comprising Portland cement, class F fly ash, sand and water. The weight ratio of limestone to the resulting mortar (including limestone) is varied from 1.4% weight ratio (30:2170) to 2.8% (60:2170) to 4.1% (90:2170). The component weights and performance characteristics of this example are given in Table 6 for each of these weight ratios.

TABLE 6

|  | Control | Mix #1 | Mix #2 | Mix #3 |
|---|---|---|---|---|
| Portland cement | 324 | 324 | 324 | 324 |
| Detroit limestone | None | 30 | 60 | 90 |
| F fly ash | 216 | 216 | 216 | 216 |
| Sand | 1350 | 1320 | 1290 | 1260 |
| Water | 280 | 280 | 280 | 280 |
| Workability | 14 | 14 | 14 | 14 |
| Mortar temp., ° F. | 65 | 65 | 65 | 65 |
| Initial set, minutes | 350 | 325 | 295 | 270 |
| 7 day strength, p.s.i. | 2475 | 2940 | 3120 | 3010 |
| 28 day strength, p.s.i. | 5500 | 5710 | 5835 | 5750 |

Example 6 shows the effects of adding increasing amounts of Detroit limestone fines to Portland cement and class F fly ash. The addition of minus #100 sieve limestone in the increasing amounts indicated in Table 6 causes a corresponding decrease in initial set time by as much as 80 minutes. Likewise, it causes an increase in 7-day strength by as much as 26% and 28-day strength by as much as 6.1% when compared with the control mix with no limestone.

EXAMPLE 7

Atlanta limestone is added to a cementitious mortar comprising Portland cement, class C fly ash, sand and water. The weight ratio of limestone to the resulting mortar (including limestone) is varied from 1.4% weight ratio (30:2162, or about 1:72) to 2.8% (60:2158 or about 1:36) to 4.2% (90:2158) to 5.6% (120:2161, or about 1:18). The component weights and performance characteristics of this example are given in Table 7 for each of these weight ratios.

TABLE 7

|  | Control | Mix #1 | Mix #2 | Mix #3 | Mix #4 |
|---|---|---|---|---|---|
| Portland cement | 324 | 324 | 324 | 324 | 324 |
| Atlanta limestone | None | 30 | 60 | 90 | 120 |
| C fly ash | 216 | 216 | 216 | 216 | 216 |
| Sand | 1350 | 1320 | 1290 | 1260 | 1230 |
| Water | 267 | 272 | 268 | 268 | 271 |
| Workability | 14 | 16 | 12 | 16 | 12 |
| Mortar temp., ° F. | 76 | 66 | 74 | 76 | 76 |
| Initial set, minutes | 382 | 360 | 313 | 290 | 281 |
| 7 day strength, p.s.i. | 4080 | 6230 | 6200 | 6270 | 6100 |
| 28 day strength, p.s.i. | 6500 | 9250 | 9000 | 8695 | 9190 |

Example 7 shows the effects of adding increasing amounts of Atlanta limestone fines to Portland cement and class C fly ash mortar. The addition of minus #100 sieve limestone in the increasing amounts indicated in Table 6 causes a corresponding decrease in initial set time by as much as 101 minutes. Likewise, it causes an increase in 7-day strength by as much as 54% and an increase in 28 day strength by as much as 42% when compared with the control mix with no limestone.

I claim:

1. A cementitious composition having enhanced initial set and rate of strength gain performance, comprising Portland cement having a fineness of at least about 3,200 Blaine and a finely divided limestone accelerator.

2. The cementitious composition of claim 1 further comprising sand and water mixed with the Portland cement and limestone to form a mortar mixture, wherein the weight ratio of limestone to the mortar mixture is at least about 1.4%.

3. The cementitious composition of claim 1 wherein the limestone has a fineness of at least about minus #100 U.S. sieve (150 micron).

4. A cementitious mortar composition having limestone-accelerated setting times and rate of strength gain, comprising Portland cement having a fineness of at least about 3,200 Blaine, sand, water, at least one component selected from the group consisting of a pozzolan and a blast furnace slag, and a limestone accelerator of minus #100 U.S. sieve, wherein the weight of said limestone has a ratio of at least about 1.4% to the weight of the mortar composition.

5. The cementitious mortar composition of claim 4 wherein said weight ratio is in the range of about 1.4% to about 5.6%.

6. The cementitious mortar composition of claim 4 wherein a pozzolan is selected from the group consisting of class C fly ash and class F fly ash.

7. The cementitious mortar composition of claim 4 wherein each pozzolan is selected from the group consisting of class C fly ash and class F fly ash.

8. The cementitious mortar composition of claim 4 wherein said at least one selected component includes class C fly ash and said weight ratio is about 2.8%.

9. The cementitious mortar composition of claim 4 wherein said at least one selected component includes class F fly ash and said weight ratio is about 2.8%.

10. The cementitious mortar composition of claim 4 wherein said at least one selected component includes ground, granulated blast furnace slag and said weight ratio is about 2.8%.

11. The cementitious mortar composition of claim 4 wherein said at least one selected component includes ground, granulated blast furnace slag and said weight ratio is about 5.5%.

12. The cementitious mortar composition of claim 4 wherein said at least one selected component includes class F fly ash and said weight ratio is in the range of about 1.4% to about 4.1%.

13. The cementitious mortar composition of claim 4 wherein said at least one selected component includes class C fly ash and said weight ratio is in the range of about 1.4% to about 5.6%.

14. A limestone-enhanced cementitious mortar composition having accelerated setting times and rate of strength gain, comprising Portland cement having a fineness of at least about 3,200 Blaine, finely divided limestone accelerator, and at least one component selected from the group consisting of a pozzolan and a blast furnace slag, wherein the weight of said limestone has a ratio of at least about 1.4% to the cumulative weight of said Portland cement, limestone, sand, water and said at least one selected component.

15. The cementitious mortar composition of claim 14 wherein said weight ratio is in the range of about 1.4% to about 5.6%.

16. The cementitious mortar composition of claim 14 wherein a pozzolan is selected from the group consisting of class C fly ash and class F fly ash.

17. The cementitious mortar composition of claim 14 wherein each pozzolan is selected from the group consisting of class C fly ash and class F fly ash.

18. The cementitious mortar composition of claim 14 wherein said at least one selected component includes class C fly ash and said weight ratio is about 2.8%.

19. The cementitious mortar composition of claim 14 wherein said at least selected component includes class F fly ash and said weight ratio is about 2.8%.

20. The cementitious mortar composition of claim 14 wherein said at least one selected component includes ground, granulated blast furnace slag and said weight ratio is about 2.8%.

21. The cementitious mortar composition of claim 14 wherein said at least one selected component includes ground, granulated blast furnace slag and said weight ratio is about 5.5%.

22. The cementitious mortar composition of claim 14 wherein said at least one selected component includes class F fly ash and said weight ratio is in the range of about 1.4% to about 4.1%.

23. The cementitious mortar composition of claim 14 wherein said at least one selected component includes class C fly ash and said weight ratio is in the range of about 1.4% to about 5.6%.

24. A method of making cement using a limestone accelerator, comprising the step of mixing ingredients comprising finely divided limestone accelerator, Portland cement having a fineness of at least about 3,200 Blaine, sand and water.

25. The method of claim 24, wherein the limestone has a weight ratio of at least about 1.4% to the cumulative weight of Portland cement, limestone, sand and water.

26. A reduced-emissions method of making a cementitious material comprising the step of mixing Portland cement having a fineness of at least about 3,200 Blaine, limestone, and at least one component selected from the group consisting of fly ash and ground, granulated blast furnace slag.

27. The method of claim 26, wherein the weight ratio of said limestone to the cumulative weight of said Portland cement, limestone, and said at least one selected component is at least about 1.4%.

28. The method of claim 26, wherein said mixing step reduces carbon dioxide emissions and reduces the initial setting time of the cementitious material.

29. The method of claim 26, wherein said mixing step reduces carbon dioxide emissions and increases the rate of strength gain of the cementitious material.

\* \* \* \* \*